United States Patent [19]
Khalidi et al.

[11] Patent Number: 5,784,707
[45] Date of Patent: *Jul. 21, 1998

[54] METHOD AND APPARATUS FOR MANAGING VIRTUAL COMPUTER MEMORY WITH MULTIPLE PAGE SIZES

[75] Inventors: Yousef A. Khalidi, Sunnyvale; Vikram P. Joshi, Fremont, both of Calif.; Madhusudhan Talluri, Madison, Wis.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 634,956

[22] Filed: Apr. 19, 1996

Related U.S. Application Data

[63] Continuation of Ser. No. 180,658, Jan. 12, 1994, abandoned.

[51] Int. Cl.$^6$ .................................................. G06F 12/10
[52] U.S. Cl. ........................ 711/206; 711/201; 711/202; 711/203; 711/205
[58] Field of Search ................................ 395/411, 412, 395/413, 400; 711/201, 202, 203, 205, 206, 220

[56] References Cited

U.S. PATENT DOCUMENTS

| | | | |
|---|---|---|---|
| 4,757,438 | 7/1988 | Thatte et al. | 395/412 |
| 5,404,485 | 4/1995 | Ban | 395/412 |
| 5,446,854 | 8/1995 | Khalidi et al. | 395/401 |
| 5,479,627 | 12/1995 | Khalidi et al. | 395/415 |

FOREIGN PATENT DOCUMENTS

| | | |
|---|---|---|
| 0373780 | 11/1989 | European Pat. Off. |
| 0408070 | 7/1990 | European Pat. Off. |
| 2315744 | 6/1975 | France |

OTHER PUBLICATIONS

European Search Report, dated Apr. 19, 1995; Examiner O. Nielsen.

(List continued on next page.)

*Primary Examiner*—Eddie P. Chan
*Assistant Examiner*—Than V. Nguyen
*Attorney, Agent, or Firm*—Blakely Sokoloff Taylor & Zafman

[57] ABSTRACT

A computer system having virtual memory that can be mapped using multiple page sizes onto logically addressable physical memory. An intermediate addressing scheme permits the mapping of several non-contiguous small pages in physical memory onto a bigger sized virtual memory page. Rather than translating a virtual address directly into a physical address, a virtual address is translated into an intermediate address that may or may not be a physical address. If the virtual page is backed by physical memory that is contiguous and aligned on a proper boundary for the page size, then the intermediate address will be the physical address and no second translation is required. If the intermediate address is not a physical address, it is then translated into a physical address. This is the case where a big page in virtual memory is backed by more than one smaller page in physical memory. Thus, non-contiguous small pages in physical memory can be mapped together using an intermediate translation to form a single big page thereby removing the requirement that a big page be mapped using a single contiguous portion of physical memory and further removing the requirement that the big page be big page boundary aligned within physical memory. Furthermore, several small pages can be promoted to a single big page simply by changing the virtual address to intermediate address mappings and also changing the intermediate address to physical address mappings to reflect the promotion thereby eliminating the need to move the contents of the small pages into a single contiguous, big page aligned region of physical memory. Furthermore, a big page sized region of virtual memory that has one or more smaller page sized holes within it can be treated as a single big virtual memory page and be backed in physical memory using only as many smaller pages as are required to back the non-hole regions of the virtual address space.

14 Claims, 10 Drawing Sheets

OTHER PUBLICATIONS

Yousef A. Khalidi, et al, Virtual Memory Support for Multiple Page Sizes, The Forth Workshop on the Workstation Operating System, Oct. 1993, pp. 104–109.

Madhusudhan Talluri, et al, Tradeoffs in Supporting Two Page Sizes, 1992 ACM 0-89791-509-7/92/005/0415, pp. 415–424.

Jerry Huck, et al, Architectural Support for Translation Table Management in Large Address Space Machines, 0884-7495/93, 1993 IEEE, pp. 39–50.

Patent Abstracts of Japan; vol. 13, No. 191 (P-867); May 9, 1989.

Khalidi et al, "Virtual memory support for multiple pages", Workstation Operating System; Jun. 1993.

METHOD AND APPARATUS FOR MANAGING VIRTUAL COMPUTER MEMORY WITH MULTIPLE PAGE SIZES

This is a continuation of application Ser. No. 08/180,658 filed Jan. 12, 1994 now abandoned.

BACKGROUND OF THE INVENTION

1. Field of the Invention

The present invention relates to the field of computer systems. More specifically, the present invention relates to the mapping of virtual pages to physical pages in a virtual memory computer system that supports multiple page sizes.

2. Art Background

Virtual memory is a technique that allows an application program to utilize a memory system as providing a large uniform primary memory. In reality the memory may be smaller, more fragmented, and/or partially simulated by secondary storage such as a hard disk. Applications access memory through virtual addresses, which are translated (mapped) by special hardware onto physical addresses. Paging and segmentation are two common implementations of virtual memory.

When implementing virtual memory using the paging technique, the virtual address space is divided into a number of fixed-size blocks called pages, each of which can be mapped onto any of the similarly sized physical pages available on the system. Typically, special memory management hardware such as a memory management unit (MMU) or a paged memory management unit (PMMU) performs the address translation from virtual addresses to physical addresses. In this type of memory management, any attempt to access data that are not present in physical (system) memory causes the PMMU to send an interrupt signal to the central processing unit (CPU); the operating system then transfers the data in from other storage (such as hard disk), without the application program "knowing" about the transfer.

In one virtual memory scheme, there is only one mapping from virtual memory space to physical memory space. In other implementations, however, there can be several address spaces, each with its own mapping to the physical address space. Thus, a first process may refer to a given physical address using a first virtual address and a second process running on the same CPU, or on a different CPU in a multi-processor environment, will refer to the given physical address by a second virtual address. In such a case, the two virtual addresses corresponding to the same physical address are referred to as "aliases".

Some CPUs are able to operate using more than one size of virtual page. For example, a virtual memory computer system address translation mechanism that supports multiple page sizes is described in U.S. patent application 08/139,549, filed on Oct. 20, 1993. Additionally, a virtual address to physical address translation cache that supports multiple page sizes is described in U.S. patent application 08/118,398, filed on Sep. 8, 1993.

Supporting multiple page sizes permits the virtual page size used in a mapping to be selected to best meet the needs of the virtual address space being mapped. If one uses big pages, a large amount of virtual memory can be translated using a single translation entry in the MMU. Therefore, fewer resources are needed for the MMU thereby increasing performance. The use of big pages can, however, lead to problems not encountered when small pages are used. A big page typically must reside in a single contiguous portion of physical memory. Obviously, the bigger the page, the bigger the single contiguous portion of physical memory that must be made available to permit the page to be loaded into physical memory. Typically, there is an overhead caused by the need to maintain "free" page lists that are used to indicate where in physical memory the next page will be loaded in the event of a page fault. When there are multiple page sizes, this overhead is increased because, typically, one free page list per page size is required.

Furthermore, regardless of page size, an addressing scheme is typically used wherein a certain number of the least significant bits of a virtual or physical address are used to indicate a particular word within a page. The number of least significant bits used to indicate a word within a page is dependent upon the size of the page being represented. For a given page size, however, the number of least significant bits dedicated to the word position within the page is fixed and is the same regardless of whether the address is a virtual address or a physical address. The remaining most significant bits of a virtual address are then used to indicate which particular page of virtual memory is being addressed. Similarly, the remaining most significant bits of a physical address are used to indicate the particular page of physical memory that is being addressed. Implicit within this addressing scheme is a requirement that each page be aligned on a boundary that is an integral multiple of the size of the page being addressed. Therefore, when loading a page into physical memory, it is not sufficient to merely find a free contiguous portion of physical memory equal in size to that of the page to be loaded. The contiguous portion of free physical memory required must begin on a page boundary dictated by the size of the page that is being loaded into physical memory. The larger the page size, the fewer the possible places in a given sized physical memory that can accommodate a given sized page.

Moreover, because big pages address a larger portion of physical memory than small pages, it is preferable to map a region of physical memory using a big page rather than using a larger number of small pages. Often, however, rather than initially mapping a large portion of virtual memory to physical memory using a big page, the operating system will map the virtual memory to physical memory incrementally over time using small pages. This results in a continuous region of virtual memory that could be mapped using a single large page being mapped by several small pages. Typically these small pages occupy non-contiguous regions in physical memory.

In a process called promotion, the operating system will recognize that the mapping made using the several small pages can be replaced by a mapping using a single large page and then make the replacement from the several small page mappings to a large page mapping. Because the small pages typically are not located in a contiguous portion of physical memory that begins on a big page boundary, to promote the small pages to a single big page, the operating system will have to find a suitable portion of physical memory that can accommodate the big page and then move the contents of the several small pages into it. Thus, although page promotion is beneficial, the promotion process is a time consuming process.

In summary, even when multiple page sizes are supported in the prior art, virtual pages are supported in physical memory using a physical page of the same page size as the virtual page being supported. This means that each physical page that backs a virtual page must be formed from a contiguously addressable region of physical memory equal in size to the size of the virtual page that is being backed by the physical memory. Furthermore, the contiguously addressable region of physical memory backing the virtual page must begin on a page alignment boundary for the size of the virtual page being backed. Moreover, the virtual page being backed by a physical page cannot include any "holes", i.e. regions within the virtual page that are not mapped onto physical memory. A significant amount of overhead within the virtual memory system is expended in order to guarantee that these constraints are satisfied.

SUMMARY OF THE INVENTION

A method and apparatus is described for providing logically addressable physical memory within a computer system having virtual memory that can be mapped onto physical memory using multiple page sizes. The use of an intermediate addressing scheme permits the mapping of several non-contiguous small pages in physical memory onto a bigger sized virtual memory page. Rather than translating a virtual address directly into a physical address, a virtual address is translated into an intermediate address that may or may not be a physical address. If the virtual page is backed by physical memory that is contiguous and aligned on a proper boundary for the page size, then the intermediate address will be the physical address and no second translation is required. If the intermediate address is not a physical address, it is then translated into a physical address. This is the case where a big page in virtual memory is backed by more than one smaller page in physical memory.

The use of intermediate addresses that are not physical addresses permits the physical memory to be treated as though it is logical memory. Therefore, non-contiguous small pages in physical memory can be snapped together using an intermediate translation to form a single big page. This process removes the requirement that a big page be mapped using a single contiguous portion of physical memory. Furthermore, this process removes the requirement that the big page be aligned within physical memory upon a corresponding big page boundary. Furthermore, several small pages can be promoted to a single big page simply by changing the virtual address to intermediate address mappings and also changing the intermediate address to physical address mappings to reflect the promotion. Therefore, the need to move the contents of the small pages into a single contiguous, big page aligned region of physical memory during a page promotion operation is eliminated. Furthermore, because a big page in virtual memory can be backed by mapping together smaller pages in physical memory, a big page sized region of virtual memory that has one or more smaller page sized holes within it can be treated as a single big virtual memory page and be backed in physical memory using only as many smaller pages as are required to back the non-hole regions of the virtual address space. Moreover, in a scheme where aliasing is permitted, then aliases also reap the benefits of the intermediate addressing scheme.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

In the following description, for purposes of explanation, specific numbers, materials and configurations are set forth in order to provide a thorough understanding of the present invention. It will be apparent to one skilled in the art, however, that the present invention may be practiced without the specific details. In other instances, well known systems are shown in diagrammatic or block diagram form in order not to obscure the present invention unnecessarily.

Figure 1:
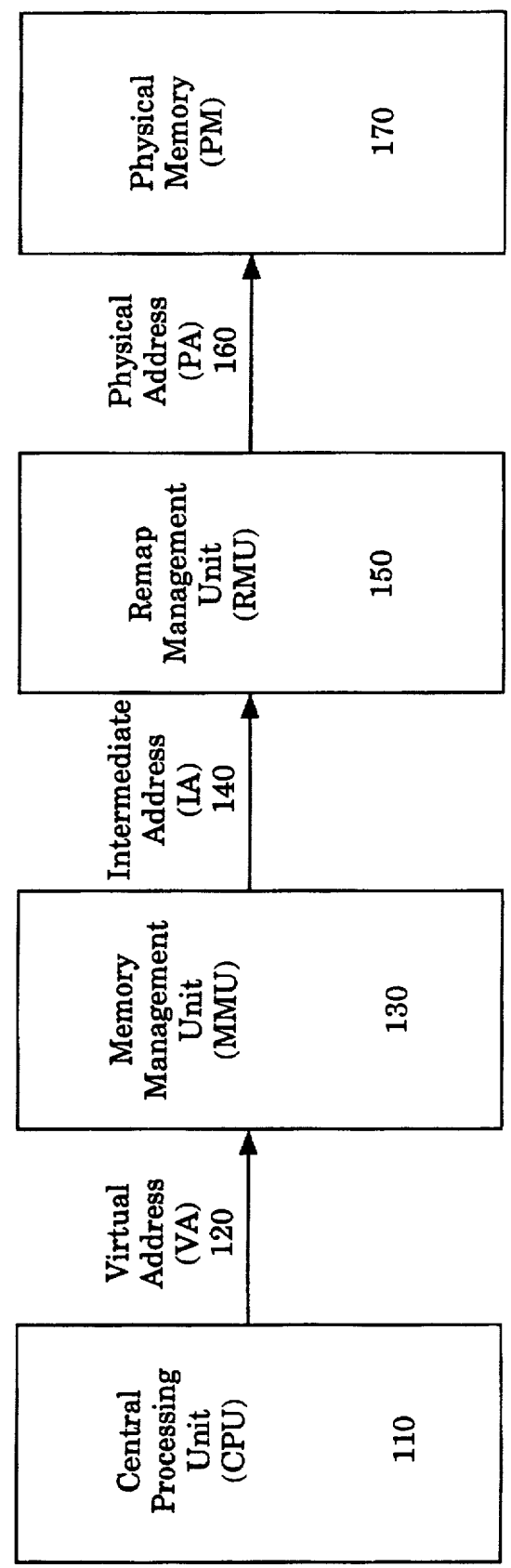
FIG. 1 illustrates a computer system that uses a memory management unit based embodiment of the present invention to perform address translation from a virtual address to an intermediate address and then to a physical address.

Referring now to FIG. 1, a computer system is illustrated that uses a memory management unit based embodiment of the present invention to perform address translation from a virtual address to an intermediate address and then to a physical address if the intermediate address is not a physical address. In computer system 100 of FIG. 1, central processing unit (CPU) 110 operates upon data and instructions that are addressed using virtual addresses. These virtual addresses are grouped into pages of continuous regions of virtual memory. Because computer system 100 can operate using more than one size of virtual page at a time, a contiguous portion of virtual memory can be viewed alternately as a single big page or as two or more smaller pages.

When CPU 110 must access an instruction or data stored within a particular page, a test is made to determine whether or not the desired virtual page contents currently reside in physical memory (PM) 170. If the desired virtual page contents are found to be residing in physical memory 170, then CPU 110 accesses the desired instruction or data directly within physical memory 170. If, on the other hand, the desired virtual page contents are found not to be residing in physical memory 170, then CPU 110 must wait until the desired virtual page contents have been loaded into physical memory 170 before an access can be made to the desired instruction or data within physical memory 170.

Memory management unit (MMU) 130 translates a virtual address (VA) 120 received from CPU 110 into an intermediate address (IA) 140. Remap management unit (RMU) 150 then takes the intermediate address 140 and translates it into a physical address (PA) 160. The physical address 160 can then be used to access the appropriate portion of physical memory 170. The range of the intermediate address space is the same as the range of the physical address space. If a virtual address is contained in a page that is stored in physical memory 170 as a single contiguous portion of physical memory that begins upon an appropriate page boundary, then the intermediate address provided by MMU 130 can be used as a physical address when accessing physical memory 170. In such a case, RMU 150 simply passes through the intermediate address as the physical address; that is, without translating the intermediate address to a physical address.

On the other hand, in cases, the intermediate address provided by MMU 130 is remapped by RMU 150 into a physical address or addresses that can be used to access physical memory 170. A first case where a non-trivial intermediate address to physical address translation occurs is when the virtual address page containing the virtual address to be translated is not stored in physical memory as a single contiguous portion of physical memory. A second non-trivial intermediate address to physical address translation case occurs when only a smaller portion of the physical memory than the virtual memory page being mapped has relevant data. A third case where a non-trivial intermediate address to physical address translation occurs when the virtual address page containing the virtual address to be translated is not stored in physical memory as a single contiguous portion of physical memory that begins upon an appropriate page boundary.

MMU 130 and RMU 150 operate together to map two or more pages of physical memory and onto a page of virtual memory. The pages of physical memory mapped onto a page of virtual memory by RMU 150 can have a different page size than that of the virtual page to which they are mapped. Furthermore, several different sized (and/or non-contiguous) pages of physical memory can be mapped together by RMU 150 onto a bigger virtual page. RMU 150 therefore permits physical memory 170 to be treated as logical memory and therefore to be logically addressed. Thus, non-contiguous portions of physical memory 170 can be mapped together by RMU 150 into a single virtual page. Furthermore, RMU 150 permits large pages to be mapped onto several smaller page pieces throughout physical memory 170 and, although these smaller page pieces still begin on a page boundary, the page boundary upon which they begin is that of a smaller page rather than that of the larger page to which they are mapped. Moreover, RMU 150 permits small virtual pages to be mapped onto larger physical pages.

The actual sizes of the pages supported by CPU 110 is immaterial, however, memory pages are typically an integral power of two number of words in size. In one embodiment, CPU 110 supports four page sizes. These page sizes are 8K words (i.e. $2^{13}$ words), 64K words (i.e. $2^{16}$ words), 512K words (i.e. $2^{19}$ words) and 4M words (i.e. $2^{21}$ words) in size. Thus, in this embodiment, with the exception of the smallest sized page, each page then can be formed by mapping together eight of the next smaller sized page.

In one embodiment of computer system 100, the system interconnect (e.g. the system bus) carries physical addresses 160 (as well as data and control signals that are not shown) to physical memory 170. Alternately, RMU 150 can be placed on the physical memory 170 side of the system interconnect and the system interconnect will then carry intermediate addresses 140 (as well as data and control signals that are not shown) to RMU 150.

Caches for data and instructions can be added to computer system 100 if desired. Caches typically have address based tags. Depending upon where within system 100 the cache is placed, the address space for the cache tags will be that of the virtual, intermediate or physical address space. If computer system 100 is expanded to be a multiprocessor system by adding additional CPUs, similarly situated caches within system 100 can use the same address space for their tags in order to maintain cache coherency. For faster accesses to caches, it is expected that caches be addressed using virtual or intermediate addresses.

Figure 2:
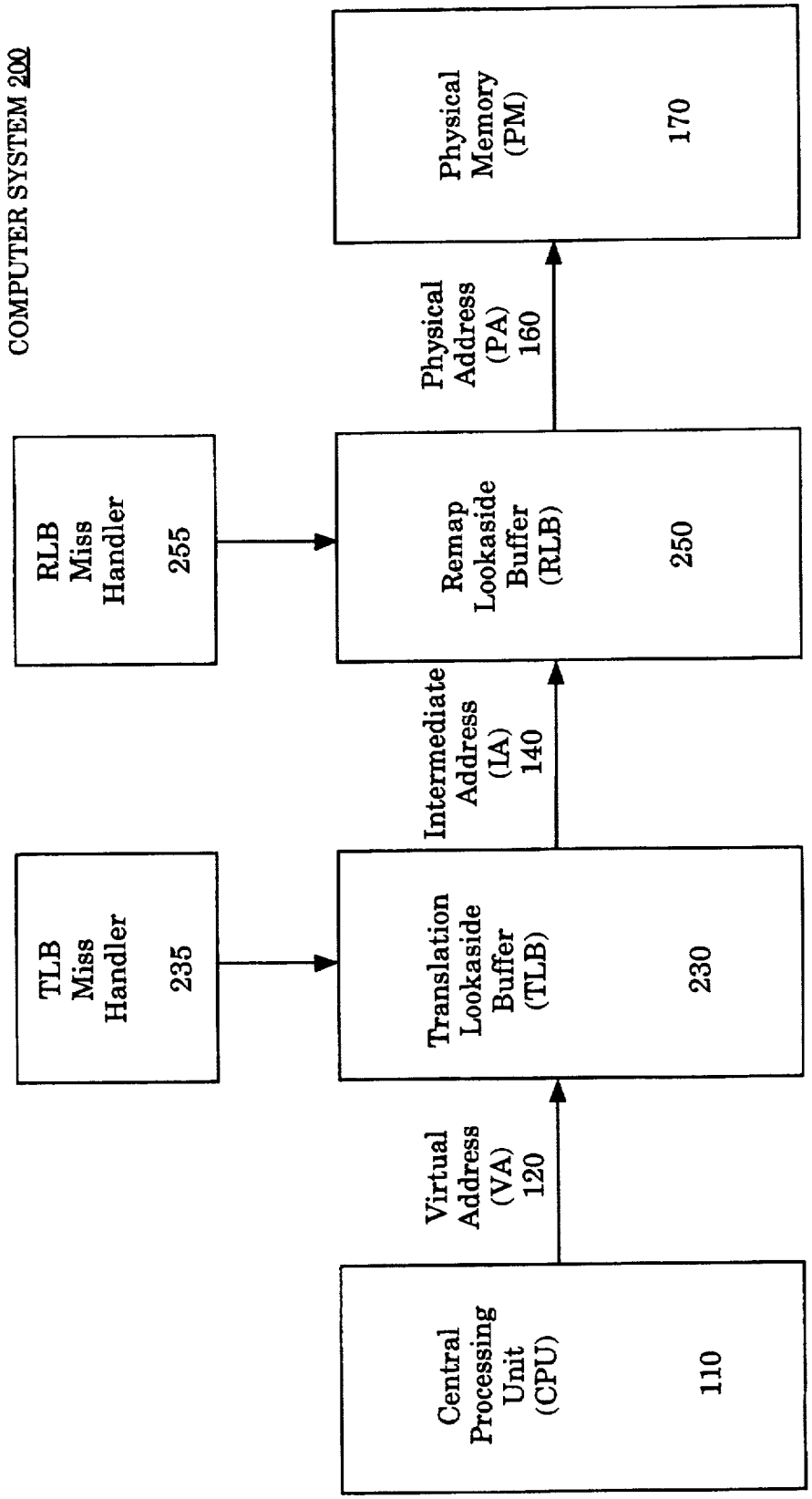
FIG. 2 illustrates a computer system that uses a translation lookaside buffer based embodiment of the present invention to perform address translation from a virtual address to an intermediate address and then to a physical address.

Referring now to FIG. 2, a computer system is illustrated that uses a translation lookaside buffer based embodiment of the present invention to perform address translation from a virtual address to an intermediate address and then to a physical address if the intermediate address is not a physical address. Computer system 200 of FIG. 2 is similar to computer system 100 of FIG. 1. MMU 130 of FIG. 1, is shown in computer system 200 of FIG. 2 as being implemented by translation lookaside buffer (TLB) 230 operating in conjunction with TLB miss handler 235. TLB 230 is basically a translation table entry (TTE) cache. Each translation table entry (TTE) contains virtual address to intermediate address translation information for at least one virtual page. If a virtual address translation is requested for a virtual page that does not have a translation table entry stored in TLB 230, then a TLB miss occurs and TLB miss handler 235 provides the requested translation to TLB 230, and ultimately to CPU 110.

Similarly, RMU 150 of FIG. 1, is shown in computer system 200 of FIG. 2 as being implemented by remap lookaside buffer (RLB) 250 operating in conjunction with RLB miss handler 255. RLB 250 operates similarly to TLB 230, however, whereas TLB 230 provides virtual address to intermediate address translations, RLB 250 provides intermediate address to physical address translations. As such, RLB 250 is basically a remap table entry (RTE) cache. Each remap table entry (RTE) contains intermediate address to physical address translation information for at least one physical page. If a physical address translation is requested for a physical page that does not have a translation stored in RLB 250, then a RLB miss occurs and RLB miss handler 255 provides the requested translation to RLB 250.

In one embodiment, TLB miss handler 235 and RLB miss handler 255 are each executed by separate processors dedicated to executing the TLB miss handling function or dedicated to executing the RLB miss handling function, respectively. In another embodiment, TLB miss handler 235 and RLB miss handler 255 are both executed by a single separate processor dedicated to executing both the TLB miss handling and RLB miss handling functions. In yet another embodiment, either TLB miss handler 235 or RLB miss handler 255 (or both TLB 235 and RLB 255 miss handlers) are executed by CPU 110.

Furthermore, because of the similarities of the functions provided by TLB miss handler 235 and provided by RLB miss handler 255, the same algorithms can be used to implement TLB miss handler 235 as can be used to implement RLB miss handler 255. This means that only a single miss handling hardware or software implementation need be supported.

Figure 3:
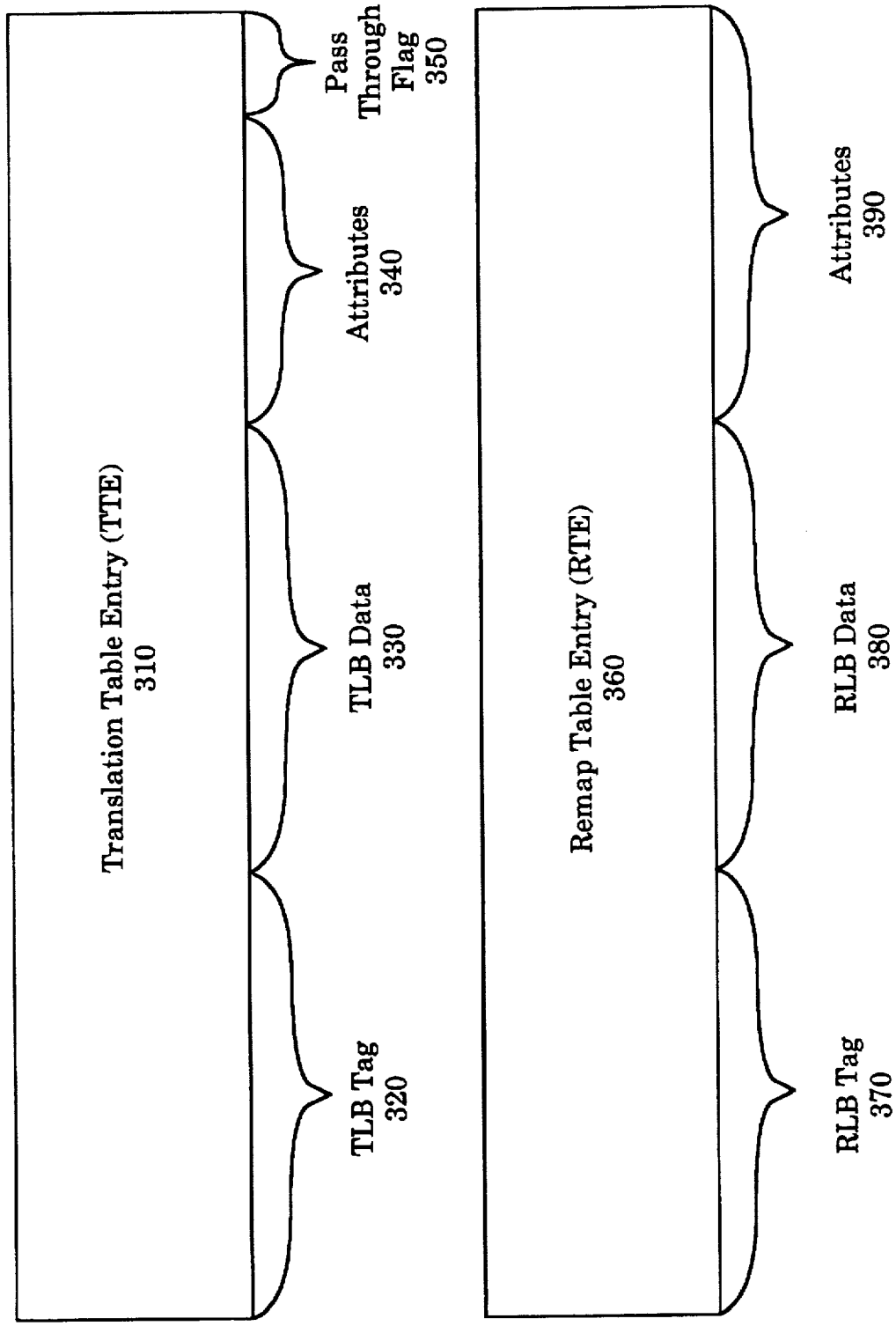
FIG. 3 illustrates the relationship between translation table entries of a translation lookaside buffer and remap table entries of a remap lookaside buffer.

Referring now to FIG. 3, the relationship between translation table entries and remap table entries is illustrated. In FIG. 3, it can be seen that translation table entry (TTE) 310 is made up of four fields. The first two fields of TTE 310 are TLB tag field 320 and TLB data field 330. TLB tag field 320 identifies a particular page in virtual memory space that contains the virtual address to be translated. TLB data field 330 identifies a particular intermediate address space page that corresponds to the virtual page identified by TLB tag field 320.

The attributes field 340 of TTE 310 contains information regarding the page size being mapped and regarding the type of operations that are permitted to be performed on the data of the virtual page corresponding to TTE 310. For example, attributes field 340 may contain a bit that indicates that one can read from, but not write to, the virtual page corresponding to TTE 310.

In the case where the intermediate address space page of TLB data field 330 is the same as the actual physical address page backing it, then the single bit field pass through flag 350 is set to indicate to the RLB that there is no need for the RLB to perform a remap translation. In effect, when the pass through bit is set, the RLB simply passes through the intermediate address translation as the physical address translation. If pass through bit 350 is not set, then the RLB uses a RTE such as RTE 360 to translate an intermediate address into a physical address.

· In FIG. 3, it can be seen that remap table entry (RTE) 360 is made up of three fields. The first two fields of RTE 360 are RLB tag field 370 and RLB data field 380. RLB tag field 370 identifies a particular page in intermediate memory space that contains the intermediate address to be translated. RLB data field 380 identifies a particular physical address space page that corresponds to the intermediate space page identified by RLB tag field 370.

The attributes field 390 of RTE 360 contains information regarding the page size being mapped and regarding the type of operations that are permitted to be performed on the data of the intermediate page corresponding to RTE 360. For example, attributes field 390 may contain a bit that indicates that can one can read from, but not write to, the intermediate page corresponding to RTE 360. Typically, the information stored in attributes field 390 of RTE 360 will be redundant in light of the information stored in attributes field 340 of TTE 310. In such a case, attributes field 390 can be eliminated from RTE 360.

Referring collectively now to FIG. 4 through FIG. 10, these figures will present examples to demonstrate various advantages presented by employing the present invention. For simplicity of presentation in these figures, three page sizes will be used. There will be a small sized page, a middle sized page and a large sized page. A middle sized page will be equal in size to two small sized pages. A large sized page will be equal in size to two middle sized pages and hence equal in size to four small sized pages. The actual size of these pages is not important for the presentation of the ideas in these figures.

Figure 4:
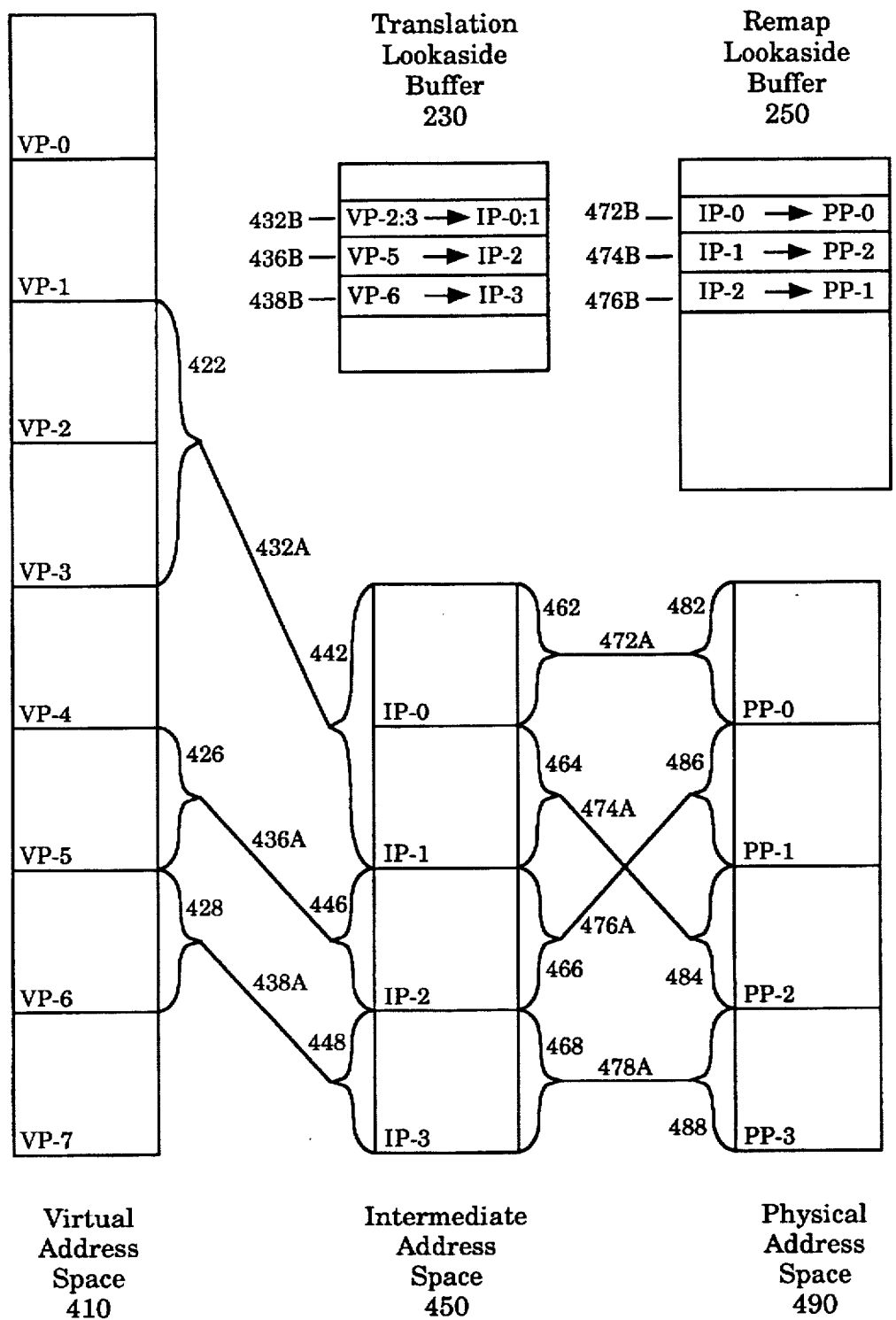
FIG. 4 illustrates the mapping of a middle sized page and two small sized pages from a region of virtual address space onto a region of intermediate address space and then onto a region of physical address space.

Referring now to FIG. 4, the mapping of a middle sized page and two small sized pages from a region of virtual address space onto a region of intermediate address space and then onto a region of physical address space is illustrated. In FIG. 4, virtual address space 410 is an eight small sized page contiguous region of the virtual address space. Thus, virtual address space 410 is formed by the eight small sized virtually addressed pages VP-0 through VP-7.

Because one middle sized page is equal in size to two small sized pages, virtual address space 410 can be viewed alternately as four middle sized pages. Pages in virtual address space 410 must be page aligned. Therefore, a first middle sized page could be formed by mapping together small pages VP-0 and VP-1, a second middle sized page could be formed by mapping together small pages VP-2 and VP-3, a third middle sized page could be formed by mapping together small pages VP-4 and VP-5 and a fourth middle sized page could be formed by mapping together small pages VP-6 and VP-7. Due to the page alignment constraint imposed upon the virtual address space, a middle sized virtual address space page could not be formed, for example, by mapping together VP-1 and VP-2 because VP-1 does not begin on a middle sized page boundary. Furthermore, due to the contiguous page constraint imposed upon the virtual address space, a middle sized virtual address space page could not be formed, for example, by mapping together VP-0 and VP-2 because VP-0 is not contiguous to VP-2.

Similarly, because one big sized page is equal in size to two middle sized pages and also equal in size to four small sized pages, virtual address space 410 can be viewed alternately as two big sized pages. Once again, pages in virtual address space 410 must be page aligned. Therefore, a first big sized page could be formed by mapping together small pages VP-0, VP-1, VP-2 and VP-3 and a second big sized page could be formed by mapping together small pages VP-4, VP-5, VP-6 and VP-7. Due to the page alignment constraint imposed upon the virtual address space, a big sized virtual address space page could not be formed, for example, by mapping together VP-1, VP-2, VP-3 and VP-4 because VP-1 does not begin on a big sized page boundary. Furthermore, due to the contiguous page constraint imposed upon the virtual address space, a big sized virtual address space page could not be formed, for example, by mapping together VP-0 and VP-2, VP-3 and VP-4 because VP-0 is not contiguous to VP-2.

It is also possible to view virtual address space 410 as a combination of big, middle and small sized pages. Therefore, for example, virtual address space 410 can be viewed as a single big sized page, a single middle sized page and two small sized pages. In this example, the single big sized page could be formed by VP-0, VP-1, VP-2 and VP-3. The single middle sized page could be formed by VP-4 and VP-5. VP-6 and VP-7 would then each represent a different small sized page.

In FIG. 4, intermediate address space 450 is a four small sized page contiguous region of the intermediate address space. Intermediate address space 450 is formed by the four small sized intermediately addressed pages IP-0 through IP-3.

Because one middle sized page is equal in size to two small sized pages, intermediate address space 450 can be viewed alternately as two middle sized pages. As is the case with virtual address space pages, pages in intermediate address space 450 must be page aligned. Therefore, a first middle sized page could be formed by mapping together small pages IP-0 and IP-1 and a second middle sized page could be formed by mapping together small pages IP-2 and IP-3. Due to the page alignment constraint imposed upon the intermediate address space, a middle sized intermediate address space page could not be formed, for example, by mapping together IP-1 and IP-2 because IP-1 does not begin on a middle sized page boundary. Furthermore, due to the contiguous page constraint imposed upon the intermediate address space, a middle sized intermediate address space page could not be formed, for example, by mapping together IP-0 and IP-2 because IP-0 is not contiguous to IP-2.

Similarly, because one big sized page is equal in size to two middle sized pages and also equal in size to four small sized pages, intermediate address space 450 can be viewed alternately as one big sized page formed by mapping together small pages IP-0, IP-1, IP-2 and IP-3.

It is also possible to view intermediate address space 450 as a combination of middle and small sized pages. Therefore, for example, intermediate address space 450 can be viewed as a single middle sized page and two small sized pages. In this example the single middle sized page could be formed by IP-0 and IP-1. IP-2 and IP-3 would then each represent a different small sized page.

In FIG. 4, physical address space 490 is a four small sized page contiguous region of the physical address space. Therefore physical address space 490 has the same range as intermediate address space 450. Physical address space 490 is formed by the four small sized physically addressed pages PP-0 through PP-3.

Because one middle sized page is equal in size to two small sized pages, physical address space 490 can be viewed alternately as two middle sized pages. Small pages from physical address space 490 can be mapped together to back a single middle sized page from intermediate address space 450. Therefore, page portions in physical address space 490 must be small page aligned. Thus, a first middle sized page could be formed by mapping together small pages PP-0 and PP-1 and a second middle sized page could be formed by mapping together small pages PP-2 and PP-3. To map a region of physical address space to a region of virtual address space without using an intermediate address space dictates that the regions in both address spaces to follow the contiguity and alignment constraints. When an intermediate address space mapping is added, the intermediate address region has to obey the constraints but the physical address space need not. By using multiple small-sized mappings from the intermediate to physical address regions, any combination of small sized physical pages can be made to correspond to one larger page of mapping from virtual to intermediate address spaces. If a middle sized page mapping is used for the intermediate to physical address, the constraints will have to be obeyed for that middle sized page mapping.

Thus, if VP-2 and VP-3 are mapped to IP-0 and IP-1 using one middle sized page mapping in TLB 230, IP-0 and IP-1 obey the contiguity and alignment constraints. The physical pages corresponding to IP-0 and IP-1 need not obey the same constraints. If PP-0 and PP-2 correspond to IP-0 and IP-1 respectively, then two small sized page entries (472 B and 474 B) are used in RLB 250. If on the other hand, PP-2 and PP-3 correspond to IP-0 and IP-1, then a single middle sized mapping entry can be used in RTLB 250.

Similarly, because one big sized page is equal in size to two middle sized pages and also equal in size to four small sized pages, physical address space 490 can be viewed alternately as one big sized page formed by mapping together small pages PP-0, PP-1, PP-2 and PP-3. Because physical address space 490 is equal in size to a single big sized page, the entire physical address space 490 is required to back a complete big sized page of intermediate address space 450. Portions of this big page, however, need not be kept in order within physical address space 490. For example, the first small page sized portion of the big page could be stored in PP-1, the second small page sized portion of the big page could be stored in PP-3, the third small page sized portion of the big page could be stored in PP-2, the fourth small page sized portion of the big page could be stored in PP-0.

It is also possible to view physical address space 490 as a combination of middle and small sized pages. Therefore, for example, physical address space 490 can be viewed as a single middle sized page and two small sized pages. If VP-0 through VP-3 was mapped onto IP-0 through IP-3 by a large page mapping, and IP-0 through IP-3 corresponded to PP-0, PP-1, PP-3 and PP-2, respectively, one middle page sized mapping could be used for mapping IP-0 through IP-1 onto PP-0 through PP-1. In such a case, one small page mapping would be used for mapping IP-2 onto PP-3 and another small page mapping would be used for mapping IP-3 onto PP2. The alignment and contiguity constraints would have to be obeyed for the middle sized page mapping from IP-0 through IP1 onto PP-0 through PP-1.

In FIG. 4, translation lookaside buffer (TLB) 230 performs the translation function described previously. Thus, TLB 230 stores translation table entries (TTEs) that provide the mapping of virtual address space pages onto intermediate address space pages. Furthermore, in FIG. 4, remap lookaside buffer (RLB) 250 performs the remap function described previously. Thus, RLB 250 stores remap table entries (RTEs) that provide the mapping of intermediate address space pages onto physical address space pages.

As stated earlier, in FIG. 4, the mapping of a middle sized page and two small sized pages from a region of virtual address space onto a region of intermediate address space and then onto a region of physical address space is illustrated. Middle sized page 422 is formed by small pages VP-2 and VP-3 in virtual address space 410 and is mapped onto middle sized page 442 formed by IP-0 and IP-1 of intermediates address space 450 as indicated by line 432A. Note that middle sized pages 422 and 442 are aligned on a middle sized page boundary and are formed by contiguous regions of virtual and intermediate address spaces 410 and 450, respectively. TTE 432B of TLB 230 contains the mapping indicated by line 432A. Middle sized page 422 in address space 410 is mapped onto a middle sized page in physical address space 490 formed by small pages PP-0 and PP-2. The first half (462) of middle sized page 442 in physical address space 410 is mapped onto a small sized page PP-0 (482) in physical address space 490 as indicated by line 472A. RTE 472B of RLB 250 contains the mapping indicated by line 472A. The second half (464) of middle sized page 442 in physical address space 410 is mapped onto a small sized page PP-2 (484) in physical address space 490 as indicated by line 474A. RTE 474B of RLB 250 contains the mapping indicated by line 474A. Note that although middle sized page 442 is aligned on a middle sized page boundary and is formed by a contiguous region of intermediate address space 450, its physical representation in physical address space 490 is not constrained to be a single middle page sized contiguous portion of physical memory. Furthermore, the middle sized page is also not constrained to begin on a medium page size alignment boundary in physical address space 490. In fact, it is merely coincidental that page 482 does begin on a medium page size aligned boundary in physical address space 490.

In FIG. 4, single small page 426 in virtual address space 410 (VP-5) is mapped onto single small page 446 in intermediate address space 450 (IP-2) as indicated by line 436A. TTE 436A of TLB 230 contains the mapping indicated by line 436A. Single small page 466 in intermediate address space 450 (IP-2) is in turn mapped onto single small page 486 in physical address space 490 (PP-1) as indicated by line 476A. RTE 476B of RLB 250 contains the mapping indicated by line 476A. Similarly, single small page 428 in virtual address space 410 (VP-6) is mapped onto single small page 448 in intermediate address space 450 (IP-3) as indicated by line 438A. TTE 438B of TLB 230 contains the mapping indicated by line 438A. Single small page 466 in intermediate address space 450 (IP-3) is in turn mapped onto single small page 488 in physical address space 490 (PP-3) as indicated by line 478.

In the case of a translation from single small virtual page 426 to physical page 486, a translation is first made to an intermediate address (426 to 446) and then a second translation is made to a physical address (466 to 486). Therefore RTE 476B is required in RLB 250 so that the remapping from intermediate address space to physical address space can be made. In the case of a translation from single small virtual page 428 to physical page 488, a translation is first made to an intermediateaddress (428 to 448). The intermediate address, however, is the same as the physical address. Therefore, in the latter case, the second translation made from an intermediate address to a physical address (i.e. from 468 to 488) is trivial and a pass through flag can be set in TTE 438B to signify that this second translation need not be made. Therefore, in the case where a pass through is indicated in the TTE, no RTE is required in RLB 250 because the remapping from intermediate address space to physical address space need not be made.

Note that in FIG. 4, if the contents of small sized physical page PP-1 and small sized physical page PP-2 had been swapped (i.e. so that PP-1 backed IP-1 and PP2 backed IP-02), then the mapping between intermediate address space 450 and physical address space 490 would become trivial. This is because the middle sized intermediate address page 442 (formed by IP-0 and IP-1) could be mapped directly onto a middle sized physical address space page (formed by PP-0 and PP-1) and the small sized intermediate address page 446 (formed by IP-2) could be mapped directly onto a small sized physical address space page (formed by PP-2). In each case, each intermediate page would be backed by an equally sized physical page that was both contiguous and aligned upon a proper boundary for its page size. Thus, TTEs 432B, 436B and 438B would each indicate that a pass through condition existed. Therefore, due to the fact that a second remapping translation was not required, there would be no need to have any valid RTEs in RLB 250.

Figure 5:
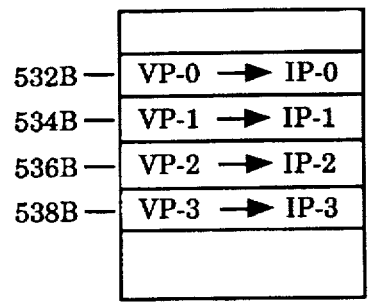
FIG. 5 illustrates the mapping of a region of virtual address space onto a region of intermediate address space and then onto a region of physical address space prior to the promotion of several small sized pages into a single big sized page.
Figure 5:
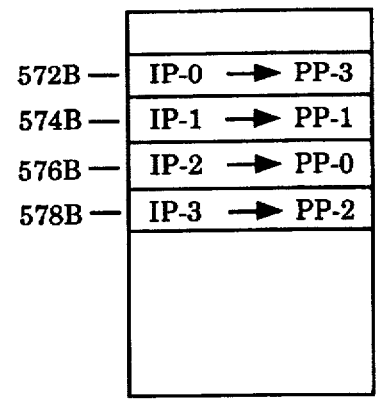
Figure 5:
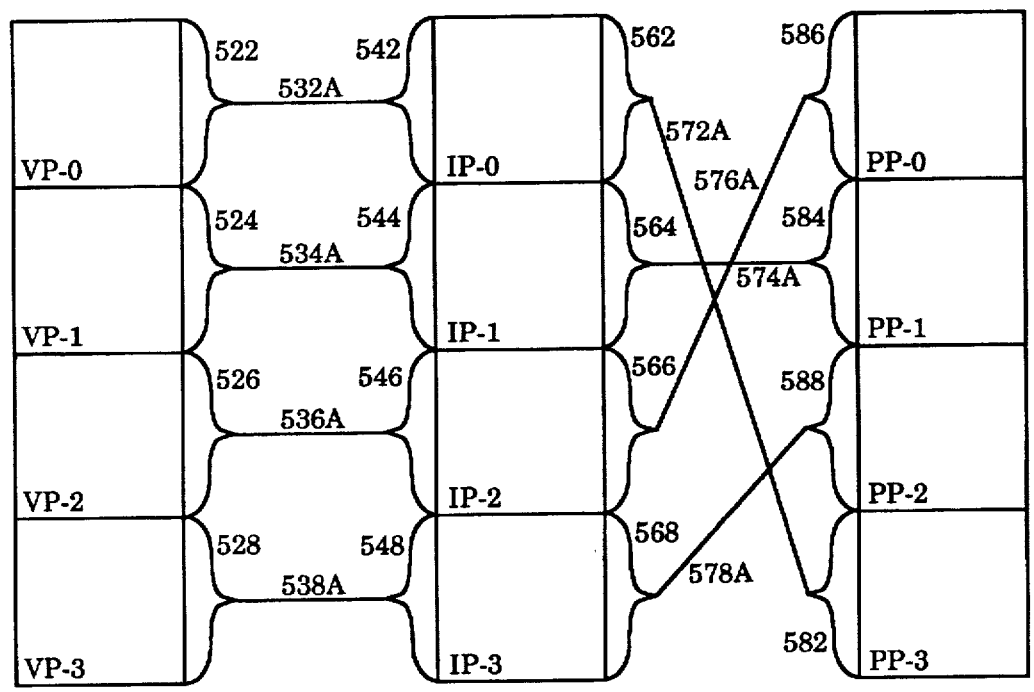
Figure 6:
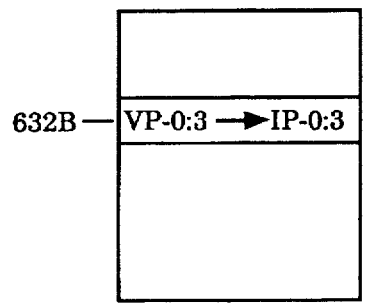
FIG. 6 illustrates the mapping of a region of virtual address space onto a region of intermediate address space and then onto a region of physical address space after the promotion of several small sized pages into a single big sized page.
Figure 6:
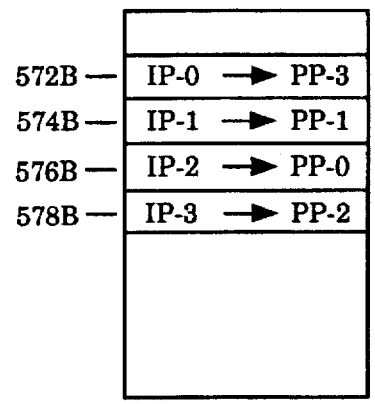
Figure 6:
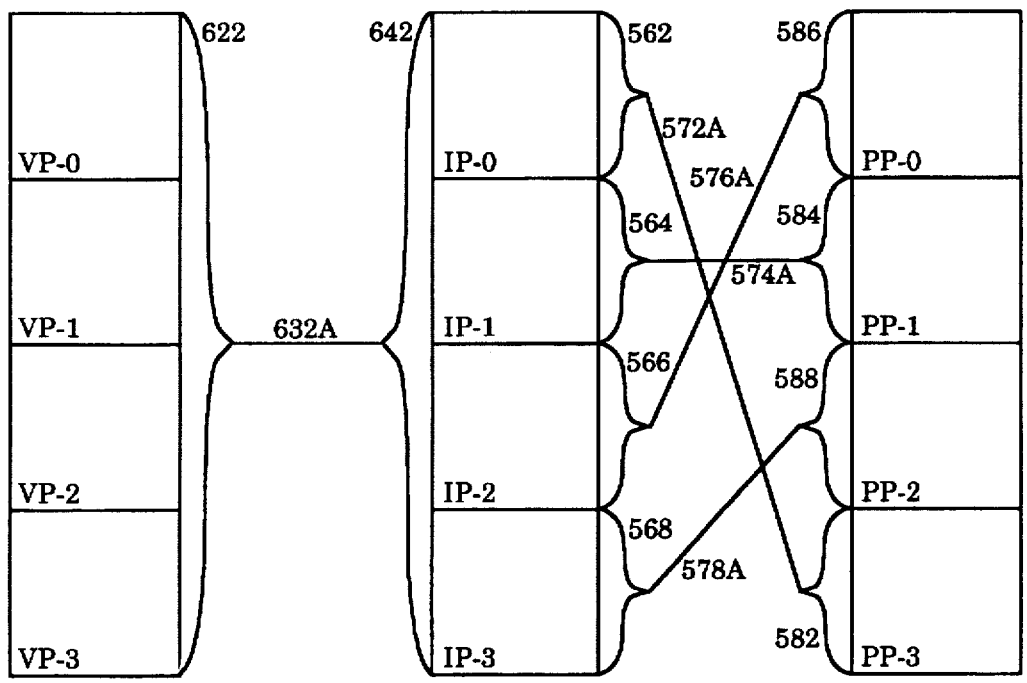

Referring now to FIG. 5 and FIG. 6, these figures together illustrate the promotion of several small sized virtual address pages into a single big sized virtual address page. FIG. 5 illustrates the mapping of a region of virtual address space onto a region of intermediate address space and then onto a region of physical address space prior to the promotion of the several small sized pages into the single big sized page. FIG. 6, on the other hand, illustrates the mappings after the promotion. Page promotion permits a single big page TTE in the TLB to replace several smaller page TTEs. Therefore, the benefit provided by big page mapping of an increased likelihood of having a TLB hit is realized. By using an intermediate addressing scheme, a big page sized region of virtual address space can be backed in physical memory by mapping together smaller sized pages. Thus, the physical memory backing does not have to meet the traditional virtual memory page criterion of being a contiguous region the size of the page being used for the mapping that is boundary aligned in physical memory upon a boundary for the size of the virtual memory page that is being backed.

Referring now to FIG. 5, in FIG. 5, virtual address space 510 is formed by small sized pages VP-0 through VP-3 and therefore is half of the virtual address space 410 of FIG. 4. Intermediate address space 450 and physical address space 490 of FIG. 5 are the same as their respective counterparts in FIG. 4. In FIG. 5, the mapping of a region of virtual address space 510 onto a region of intermediate address space 450 and then onto a region of physical address space 490 prior to the promotion of several small sized pages into a single big sized page is illustrated. In FIG. 5, TLB 230 and RLB 250 have only changed from FIG. 4 to the extent that the translation information stored within the TTEs of TLB 230 and the remapping information stored within the RTEs of RLB 250 have changed to reflect the mappings of FIG. 5.

In FIG. 5, single small page 522 in virtual address space 510 (VP-0) is mapped onto single small page 542 in intermediate address space 450 (IP-0) as indicated by line 532A. TTE 532B of TLB 230 contains the mapping indicated by line 532A. Single small page 562 in intermediate address space 450 (IP-0) is in turn mapped onto single small page 582 in physical address space 490 (PP-3) as indicated by line 572A. RTE 572B of RLB 250 contains the mapping indicated by line 572A.

Similarly, single small page 524 in virtual address space 510 (VP-1) is mapped onto single small page 544 in intermediate address space 450 (IP-1) as indicated by line 534A. TTE 534B of TLB 230 contains the mapping indicated by line 534A. Single small page 564 in intermediate address space 450 (IP-1) is in turn mapped onto single small page 584 in physical address space 490 (PP-1) as indicated by line 574A. RTE 574B of RLB 250 contains the mapping indicated by line 574A.

Furthermore, single small page 526 in virtual address space 510 (VP-2) is mapped onto single small page 546 in intermediate address space 450 (IP-2) as indicated by line 536A. TTE 536B of TLB 230 contains the mapping indicated by line 536A. Single small page 566 in intermediate address space 450 (IP-2) is in turn mapped onto single small page 586 in physical address space 490 (PP-0) as indicated by line 576A. RTE 576B of RLB 250 contains the mapping indicated by line 576A.

Finally, single small page 528 in virtual address space 510 (VP-3) is mapped onto single small page 548 in intermediate address space 450 (IP-3) as indicated by line 538A. TTE 538B of TLB 230 contains the mapping indicated by line 538A. Single small page 568 in intermediate address space 450 (IP-3) is in turn mapped onto single small page 588 in physical address space 490 (PP-2) as indicated by line 578A. RTE 578B of RLB 250 contains the mapping indicated by line 578A.

In FIG. 5, the four small sized pages VP-0 through VP-3 in virtual address space 510 are ripe for promotion to a single big sized page. In the prior art, before these pages could be promoted, the contents of regions of physical memory would have to be moved around so that the promoted big page was backed properly by a big page in physical memory that was both contiguous and big page boundary aligned. Thus, although the current contents of small page 584 in this example are properly located in PP-1, before a page promotion could occur, the current contents of small page 582 would have to be moved into PP-0, the current contents of small page 586 would have to be moved into PP-2, and the current contents of small page 588 would have to be moved into PP-3. In a worse case scenario, all of the contents of the small pages backing the new big page would have to be moved to a portion of physical memory where the new big page was both big paged boundary aligned and backed by a big page formed from a contiguous portion of physical memory.

Referring now to FIG. 6, in FIG. 6, virtual address space 610, intermediate address space 450 and physical address space 490 are the same as their respective counterparts in FIG. 5. In FIG. 6, the mapping of a region of virtual address space 610 onto a region of intermediate address space 450 and then onto a region of physical address space 490 after to the promotion of several small sized pages into a single big sized page is illustrated. In FIG. 6, TLB 230 has only changed from FIG. 5 to the extent that the translation information stored within the TTEs of TLB 230 have changed to reflect the mappings of FIG. 6 caused by the promotion. In FIG. 6, the remapping information stored within the RTEs of RLB 250 have not changed from their values within FIG. 5 because the promotion did not affect the mappings from intermediate address space 450 to physical address space 490.

In FIG. 6, single big page 622 in virtual address space 510 (VP-0, VP-1, VP-2 and VP-3) is mapped onto single big page 642 in intermediate address space 450 (IP-0, IP-1, IP-2 and IP-3) as indicated by line 632A. TTE 632B of TLB 230 contains the mapping indicated by line 632A. Therefore, the mapping between virtual address space 510 and intermediate address space 450 has been changed through promotion so that four small pages are now represented as a single big page. Thus, the four TTEs previously required in the TLB (one per old small page) have been replaced by a single TTE for the new big page. Note that the promotion process has occurred without the need to change the mappings between the pages of intermediate address space 450 and physical address space 490.

Thus, single small page 562 in intermediate address space 450 (IP-0) is still mapped onto single small page 582 in physical address space 490 (PP-3) as indicated by line 572A and RTE 572B of RLB 250 still contains the mapping indicated by line 572A. Similarly, single small page 564 in intermediate address space 450 (IP-1) is still mapped onto single small page 584 in physical address space 490 (PP-1) as indicated by line 574A and RTE 574B of RLB 250 still contains the mapping indicated by line 574A. Furthermore, single small page 566 in intermediate address space 450 (IP-2) is in turn mapped onto single small page 586 in physical address space 490 (PP-0) as indicated by line 576A and RTE 576B of RLB 250 still contains the mapping indicated by line 576A. Finally, single small page 568 in intermediate address space 450 (IP-3) is in turn mapped onto single small page 588 in physical address space 490 (PP-2) as indicated by line 578A and RTE 578B of RLB 250 still contains the mapping indicated by line 578A.

Therefore, the single big sized page of virtual address space 510 is backed by four small sized pages of physical address space 490 but the requirement that the backing pages in physical memory be contiguous and big sized page boundary aligned has been eliminated. Thus the promotion overhead caused by relocating pages resident in physical memory no longer applies.

Figure 7:
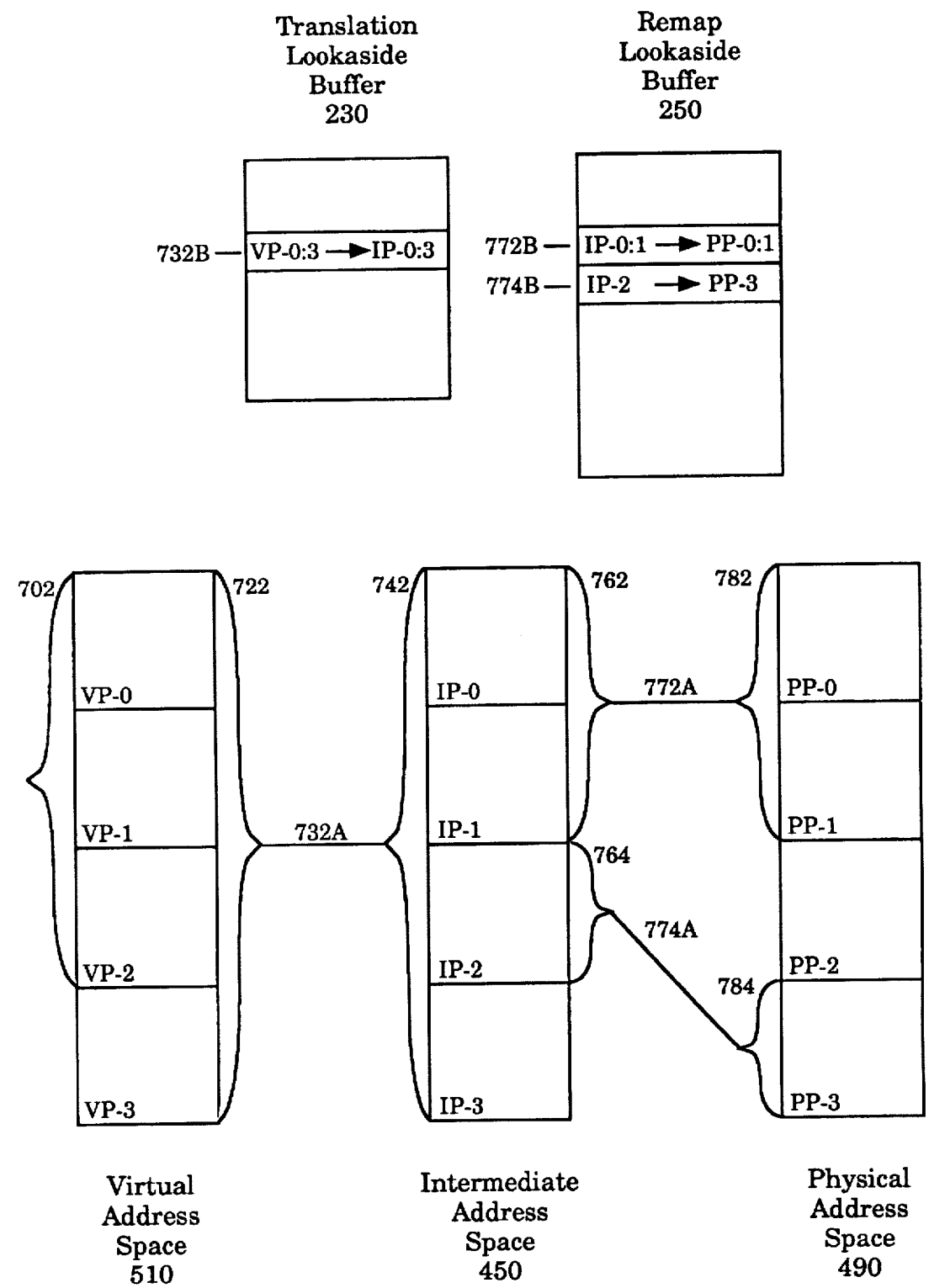
FIG. 7 illustrates the mapping of a region of virtual address space onto a region of intermediate address space and then onto a region of physical address space wherein an middle sized page and a small sized page are treated as a single big sized page having a small page sized "hole" at the end of the big sized page.
Figure 8:
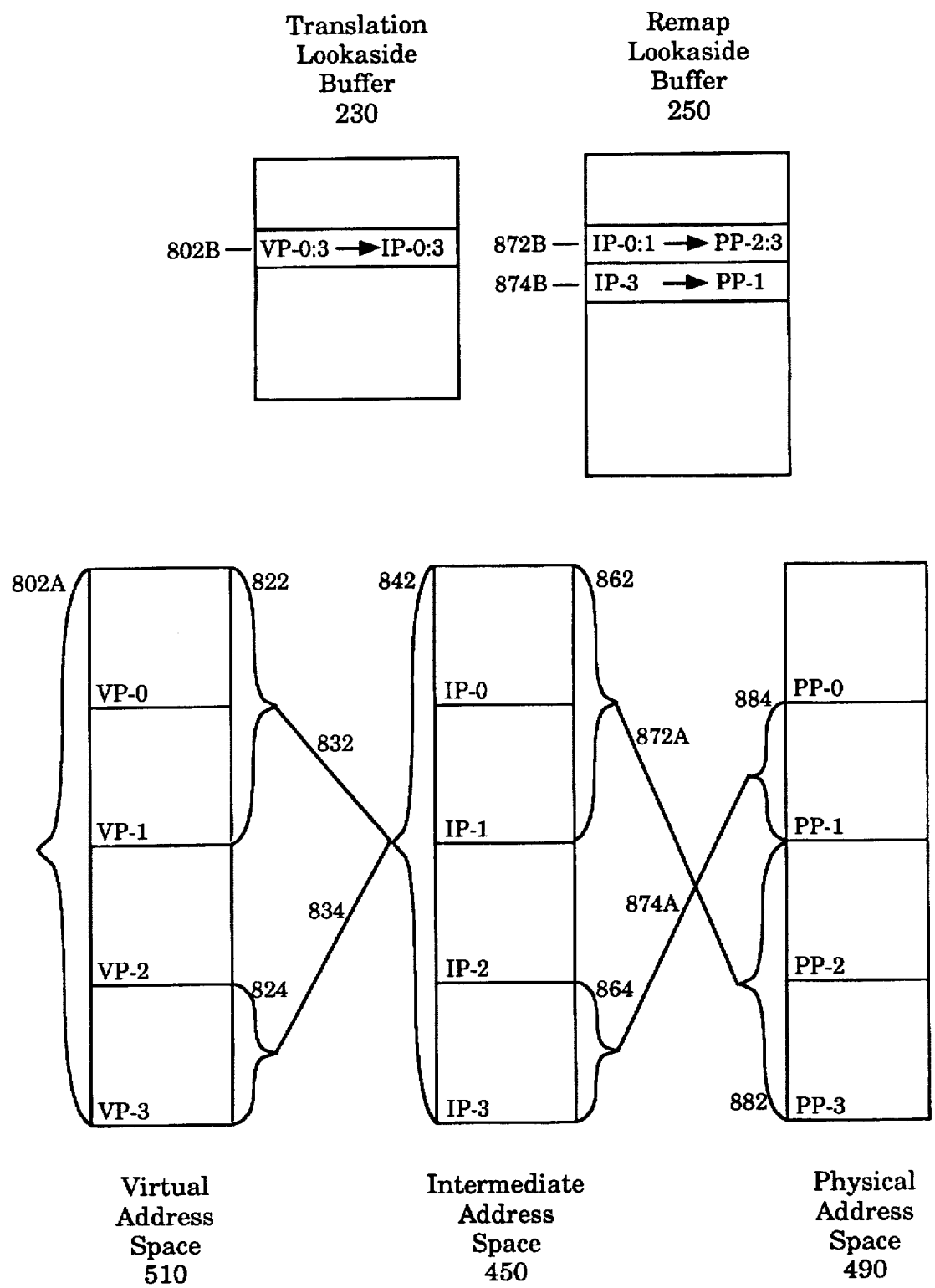
FIG. 8 illustrates the mapping of a region of virtual address space onto a region of intermediate address space and then onto a region of physical address space wherein a middle sized page and a small sized page are treated as a single big sized page having a small page sized "hole" within the big sized page.

Referring now to FIG. 7 and FIG. 8, these figures both illustrate the treatment of several small sized virtual address pages as a single big sized virtual address page that has a small page sized "hole". FIG. 7 illustrates the mapping of a region of virtual address space onto a region of intermediate address space and then onto a region of physical address space when the small page sized hole is at the end of the big sized page. FIG. 8, on the other hand, illustrates the mappings when the small page sized hole is not at the end of the big sized page. In each case, a single big page TTE in the TLB can replace several smaller page TTEs. Therefore, the benefit provided by big page mapping of an increased likelihood of having a TLB hit is realized for a region of virtual address space that does not fit the traditional virtual memory page criterion of being a contiguous region the size of the page being used for the mapping. Referring now to FIG. 7, in FIG. 7, virtual address space 610, intermediate address space 450 and physical address space 490 are the same as their respective counterparts in FIG. 6. In FIG. 7, the mapping is illustrated of a region of virtual address space 610 onto a region of intermediate address space 450 and then onto a region of physical address space 490 wherein a middle sized page and a small sized page are treated as a single big sized page having a small page sized "hole" at the end of the big sized page. In FIG. 7, TLB 230 and RLB 250 have only changed from FIG. 6 to the extent that the translation information stored within the TTEs of TLB 230 and the remapping information stored within the RTEs of RLB 250 have changed to reflect the mappings of FIG. 7.

In FIG. 7, region 702 of virtual address space 510 (formed by VP-0, VP-1 and VP-2) is treated as though it is a single big sized page (722) with a single small page sized "hole" at the end (VP-3). In effect, the present invention permits a region of virtual address space to be promoted to a larger sized page than has actually been allocated. Thus, in this example, rather than requiring three small page TTEs in the TLB to describe region 702, a single big page TTE that describes region 722 is used.

The single big page 722 in virtual address space 610 is mapped onto single big page 742 in intermediate address space 450 (IP-0, IP-1, IP-2 and IP-3) as indicated by line 732A. TTE 732B of TLB 230 contains the mapping indicated by line 732A. Only three of the four small sized sections of intermediate address space 450 are actually backed by physical memory. In this example, a single small page sized portion of physical memory and a single middle page sized portion have been mapped together to provide the backing for region 702. Single middle sized page 762 in intermediate address space 450 (IP-0 and IP-1) is mapped onto single middle sized page 782 in physical address space 490 (PP-0 and PP-1) as indicated by line 772A. RTE 772B of RLB 250 contains the mapping indicated by line 772A. Similarly, single small page 764 in intermediate address space 450 (IP-2) is mapped onto single small page 784 in physical address space 490 (PP-3) as indicated by line 774A. RTE 774B of RLB 250 contains the mapping indicated by line 774A.

Alternately, physical backing for region 702 could be provided by mapping three small sized pages in intermediate address space 450 onto three small sized pages in physical address space 490. In the former case, only two RTEs (one for the middle sized page and one for the small sized page) are required in RLB 250 to provide the mapping. In the latter case, three RTEs (one per small sized page) would be required in RLB 250, but the contiguity constraint and the middle sized page boundary alignment constraint imposed on the middle sized page in the former case would be not apply.

Referring now to FIG. 8, in FIG. 8, virtual address space 610, intermediate address space 450 and physical address space 490 are the same as their respective counterparts in FIG. 7. In FIG. 8, the mapping is illustrated of a region of virtual address space 610 onto a region of intermediate address space 450 and then onto a region of physical address space 490 wherein a middle sized page and a small sized page are treated as a single big sized page having a small page sized "hole" within the big sized page. In FIG. 8, TLB 230 and RLB 250 have only changed from FIG. 7 to the extent that the translation information stored within the TTEs of TLB 230 and the remapping information stored within the RTEs of RLB 250 have changed to reflect the mappings of FIG. 8.

In FIG. 8, region 822 (formed by VP-0 and VP-1) and region 824 (formed by VP-3) of virtual address space 510 are mapped together and are then treated as though they are a single big sized page 802A (formed by VP-0, VP-1, VP-2 and VP-3) with a single small page sized "hole" (VP-2) located within it. Once again, in effect, the present invention permits a region of virtual address space to be promoted to a larger sized page than has actually been allocated. Thus, in this example, rather than requiring two TTEs in the TLB to describe regions 832 and 824, a single big page TTE (802B) that describes region 802A is used.

The single middle sized page 822 (VP-0 and VP-1) and the single small sized page 824 (VP-3) in virtual address space 610 are mapped onto single big page 842 in intermediate address space 450 (IP-0, IP-1, IP-2 and IP-3) as indicated by lines 832 and 834, respectively. Only three of the four small page sized sections of intermediate address space 450 are actually backed by physical memory. In this example, a single small page sized portion of physical memory and a single middle page sized portion have been mapped together to provide the backing for regions 824 and 822. Single middle sized page 862 in intermediate address space 450 (IP-0 and IP-1) is mapped onto single middle sized page 882 in physical address space 490 (PP-2 and PP-3) as indicated by line 872A. Similarly, single small page 864 in intermediate address space 450 (IP-3) is mapped onto single small page 884 in physical address space 490 (PP-1) as indicated by line 874A.

Alternately, physical backing for regions 822 and 824 could be provided by mapping three small sized pages in intermediate address space 450 onto three small sized pages in physical address space 490. In the former case, only two RTEs (one for the middle sized page and one for the small sized page) would be required in the RLB to provide the mapping. In the latter case, three RTEs (one per small sized page) would be required for the RLB, but the contiguity constraint and the middle sized page boundary alignment constraint imposed on the middle sized page in the former case would not apply.

Figure 9:
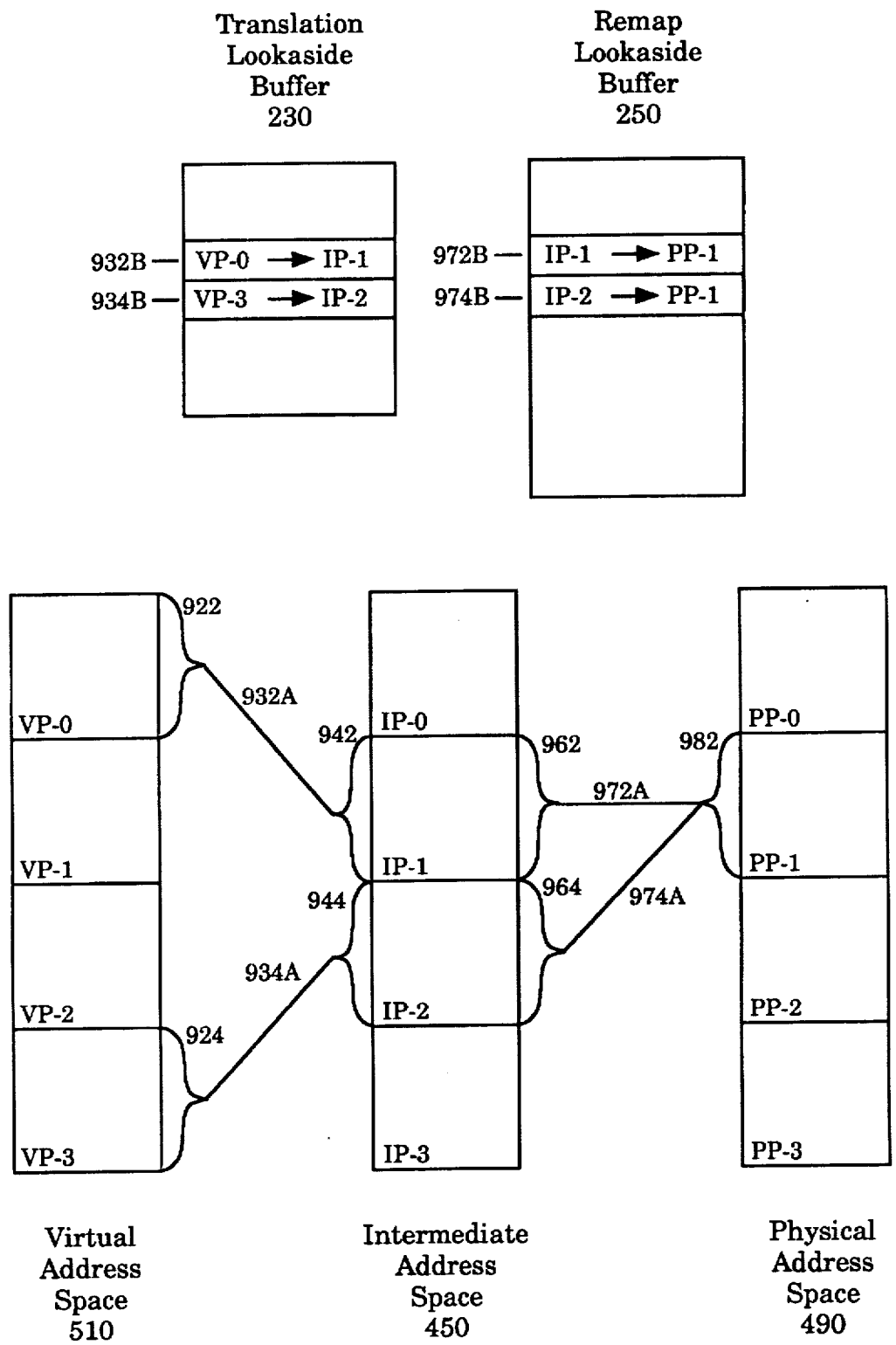
FIG. 9 illustrates the mapping of a region of virtual address space onto a region of intermediate address space and then onto a region of physical address space wherein two different small page sized regions in virtual address space are backed by the same single small sized page in physical memory.
Figure 10:
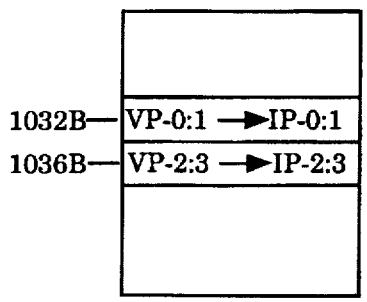
FIG. 10 illustrates the mapping of a region of virtual address space onto a region of intermediate address space and then onto a region of physical address space wherein two different middle page sized regions in virtual address space are backed by mapping together the same two small sized pages in physical memory.
Figure 10:
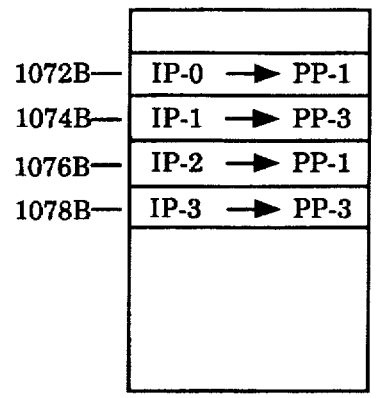
Figure 10:
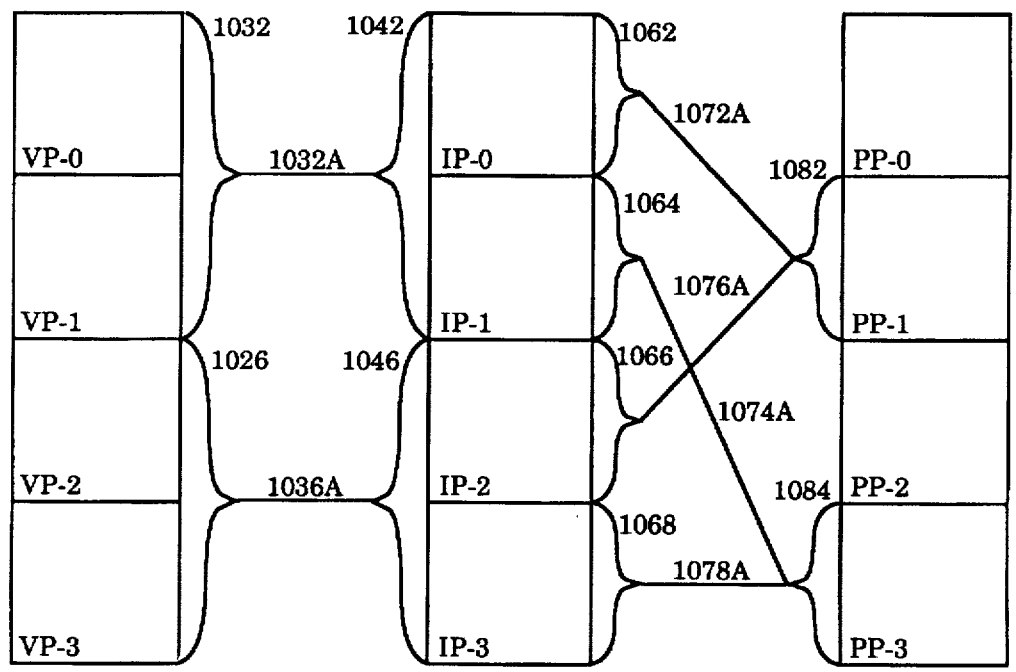

Referring now to FIG. 9 and FIG. 10, these figures both illustrate cases wherein two different page sized regions in virtual address space are backed by the same like sized page in physical memory. FIG. 9 illustrates the mapping of a region of virtual address space onto a region of intermediate address space and then onto a region of physical address space wherein two different small page sized regions in virtual address space are backed by the same single small sized page in physical memory. FIG. 10, on the other hand, illustrates the mappings when two different middle page sized regions in virtual address space are backed by mapping together the same two small sized pages in physical memory. In FIG. 9, the small sized page of physical memory obeys the contiguity constraint and the boundary alignment constraint. In FIG. 10, however, the intermediate addressing scheme permits two small sized pages of physical memory to be mapped together to back the two different middle sized virtual memory pages. Therefore, in FIG. 10, the contiguity constraint and the middle sized page boundary alignment constraint traditionally imposed on physical memory does not apply.

FIG. 9 illustrates the mapping of a region of virtual address space onto a region of intermediate address space and then onto a region of physical address space wherein two different small page sized regions in virtual address space are backed by the same single small sized page in physical memory. In FIG. 9, virtual address space 610, intermediate address space 450 and physical address space 490 are the same as their respective counterparts in FIG. 8. In FIG. 9, TLB 230 and RLB 250 have only changed from FIG. 8 to the extent that the translation information stored within the TTEs of TLB 230 and the remapping information stored within the RTEs of RLB 250 have changed to reflect the mappings of FIG. 9.

In FIG. 9, single small page 922 in virtual address space 610 (VP-0) is mapped onto single small page 942 in intermediate address space 450 (IP-1) as indicated by line 932A. TTE 932B of TLB 230 contains the mapping indicated by line 932A. Single small page 962 in intermediate address space 450 (IP-1) is in turn mapped onto single small page 982 in physical address space 490 (PP-1) as indicated by line 972A. RTE 972B of RLB 250 contains the mapping indicated by line 972A.

Similarly, single small page 924 in virtual address space 610 (VP-3) is mapped onto single small page 944 in intermediate address space 450 (IP-2) as indicated by line 934A. TTE 934B of TLB 230 contains the mapping indicated by line 934A. Single small page 964 in intermediate address space 450 (IP-2) is in turn mapped onto single small page 984 in physical address space 490 (PP-1) as indicated by line 974A. RTE 974B of RLB 250 contains the mapping indicated by line 974A. Thus, it can be seen that the intermediate addressing scheme permits two virtual memory pages to be backed by a single same sized page in physical memory.

FIG. 10 illustrates the mapping of a region of virtual address space onto a region of intermediate address space and then onto a region of physical address space wherein two different middle page sized regions in virtual address space are backed by mapping together the same two small sized pages in physical memory. In FIG. 10, virtual address space 610, intermediate address space 450 and physical address space 490 are the same as their respective counterparts in FIG. 9. In FIG. 10, TLB 230 and RLB 250 have only changed from FIG. 9 to the extent that the translation information stored within the TTEs of TLB 230 and the remapping information stored within the RTEs of RLB 250 have changed to reflect the mappings of FIG. 10.

In FIG. 10, single middle sized page 1032 in virtual address space 610 (VP-0 and VP-1) is mapped onto single middle sized page 1042 in intermediate address space 450 (IP-0 and IP-1) as indicated by line 1032A. TTE 1032B of TLB 230 contains the mapping indicated by line 1032A. The small page sized first half 1062 of single middle sized page 1042 in intermediate address space 450 (IP-0) is in turn mapped onto single small sized page 1082 in physical address space 490 (PP-1) as indicated by line 1072A. RTE 1072B of RLB 250 contains the mapping indicated by line 1072A. The small page sized second half 1064 of single middle sized page 1042 in intermediate address space 450 (IP-1) is in turn mapped onto single small sized page 1084 in physical address space 490 (PP-3) as indicated by line 1074A. RTE 1074B of RLB 250 contains the mapping indicated by line 1074A.

Similarly, single middle sized page 1026 in virtual address space 610 (VP-2 and VP-3) is mapped onto single middle sized page 1046 in intermediate address space 450 (IP-2 and IP-3) as indicated by line 1036A. TTE 1036B of TLB 230 contains the mapping indicated by line 1036A. The small page sized first half 1066 of single middle sized page 1046 in intermediate address space 450 (IP-2) is in turn mapped onto single small sized page 1082 in physical address space 490 (PP-1) as indicated by line 1076A. RTE 1076B of RLB 250 contains the mapping indicated by line 1076A. The small page sized second half 1068 of single middle sized page 1048 in intermediate address space 450 (IP-3) is in turn mapped onto single small sized page 1084 in physical address space 490 (PP-3) as indicated by line 1078A. RTE 1078B of RLB 250 contains the mapping indicated by line 1078A. Thus, it can be seen that the intermediate addressing scheme permits two virtual memory pages to be backed by mapping together smaller sized pages in physical memory to form a single bigger page. Therefore, because of the intermediate addressing scheme, in FIG. 10, the contiguity constraint and the middle sized page boundary alignment constraint traditionally imposed on physical memory does not apply.

While the method and apparatus of the present invention has been described in terms of its presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. A method for managing virtual memory in a computer system comprising the steps of:
   receiving a virtual memory address, comprising a high order virtual page address and a low order virtual page offset, from a central processing unit (CPU);
   translating the virtual memory address to an intermediate address by using the virtual page address to look up a first intermediate page address and replacing the virtual page address with the first intermediate page address to form the intermediate address; and
   translating the intermediate address to a physical memory address by using a second intermediate page address, comprising the first intermediate page address and at least one high order bit from the virtual page offset, to look up a physical memory page address and replacing the second intermediate page address with the physical memory page address to form the physical memory address.

2. The method of claim 1 wherein the means for looking up the first intermediate page address is a translation lookaside buffer.

3. The method of claim 1 wherein the means for looking up the physical memory page address is a remap lookaside buffer.

4. The method of claim 1 further comprising checking a translation pass-through flag in the translation table to determine if the intermediate address is the same as the physical memory address and, if so, using the intermediate address as the physical memory address.

5. The method of claim 1 further comprising looking up a virtual page size associated with the virtual address to identify the virtual page address portion of the virtual address.

6. The method of claim 1 further comprising looking up an intermediate page size associated with the intermediate address to identify the second intermediate page address portion of the intermediate address.

7. A method for managing virtual memory in a computer system comprising the steps of:
   receiving a virtual memory address, comprising a high order virtual page address and a low order virtual page offset, from a central processing unit(CPU);
   using a translation lookaside buffer to look up a virtual page size, a first intermediate page address, and a translation pass through flag by using the virtual memory address;
   replacing the virtual page address with the first intermediate page address to form an intermediate address;
   checking the translation pass through flag to determine if the intermediate address is the same as a physical memory address and,
      if so, using the intermediate address as the physical memory address,
      otherwise, using a remap lookaside buffer to look up a second intermediate page size to identify a second intermediate page address portion of the intermediate address, and a physical memory page address;
         the second intermediate page address, comprising the intermediate page address and at least one high order bit from the virtual page offset, is used to look up the physical memory page address;
         the second intermediate page address is replaced by the physical memory page address to form the physical address.

8. An apparatus for managing virtual memory in a computer system comprising:
   a translation table comprising a plurality of translation entries, each translation entry comprising a virtual page index address and a first intermediate page address;
   a remap table comprising a plurality of remap entries, each remap entry comprising an intermediate page index address and a physical memory page address;
   a first translator operatively connected to the translation table and a central processing unit (CPU) for
      receiving a virtual memory address, comprising a high order virtual page address and a low order virtual page offset, from the CPU,
      locating the translation entry for which the virtual page index address corresponds to the virtual page address,
      retrieving the first intermediate page address from the located translation entry, and
      combining the first intermediate page address with the virtual page offset to form an intermediate address, comprising a high order second intermediate page address, which in turn comprises the first intermediate page address and at least one high order bit from the virtual page offset, and a low order intermediate page offset; and
   a second translator operatively connected to the remap table and the first translator for
      receiving the intermediate address from the first translator,
      locating the remap entry for which the intermediate page index address corresponds to the second intermediate page address,
      retrieving the physical memory page address from the located remap entry, and
      combining the physical memory page address with the intermediate page offset to produce a physical memory address.

9. The apparatus of claim 8 further comprising using the first translator for looking up a virtual page size associated with the virtual address to identify the virtual page address portion of the virtual address.

10. The apparatus of claim 8 further comprising using the second translator for looking up an intermediate page size associated with the intermediate address to identify the second intermediate page address portion of the intermediate address.

11. The apparatus of claim 8 wherein the translation table is stored in a translation lookaside buffer.

12. The apparatus of claim 8 wherein the remap table is stored in a remap lookaside buffer.

13. The apparatus of claim 8 wherein the translation table entries further comprise a translation pass-through flag which, when set, indicates that the physical page address is the same as the intermediate page address and that there is no entry to be retrieved from the remap table for this intermediate address.

14. An apparatus for managing virtual memory in a computer system comprising:
- a translation lookaside buffer (TLB) comprising a plurality of TLB entries, each TLB entry comprising a virtual index address, a virtual page size, a first intermediate page address, and a pass-through flag;
- a remap lookaside buffer (RLB) comprising a plurality of RLB entries, each RLB entry comprising an intermediate index address, a second intermediate page size, and a physical memory page address;
- a first translator operatively connected to the TLB and a central processing unit (CPU) for
  - receiving a virtual memory address, comprising a high order virtual page address and a low order virtual page offset, from the CPU,
  - locating the TLB entry for which the virtual index address corresponds to the virtual address,
  - retrieving the virtual page size, the first intermediate page address and the pass-through flag from the located TLB entry, and
  - combining the first intermediate page address with the virtual page offset to form an intermediate address, comprising a high order second intermediate page address, which in turn comprises the first intermediate page address and at least one high order bit from the virtual page offset, and a low order intermediate page offset; and
- a second translator operatively connected to the RLB and the first translator for
  - receiving the pass-through flag and the intermediate address from the first translator and
  - if the pass-through flag is not set,
    - locating the RLB entry for which the intermediate index address corresponds to the intermediate address,
    - retrieving the second intermediate page size and the physical memory page address from the located RLB entry, and
    - combining the physical memory page address with the intermediate page offset to produce a physical memory address;
  - otherwise, using the intermediate address as the physical memory address.

* * * * *